United States Patent
Birk et al.

(10) Patent No.: US 9,074,821 B2
(45) Date of Patent: Jul. 7, 2015

(54) HEAT EXCHANGER FOR COOLING REACTION GAS, INCLUDING A TUBULAR CONNECTION BETWEEN A COOLED TUBE AND AN UNCOOLED TUBE

(75) Inventors: Carsten Birk, Berlin (DE); Michael Vogt, Berlin (DE); David Todd Eisenhawer, Red Deer (CA)

(73) Assignee: BORSIG GMBH, Berlin (DE)

( * ) Notice: Subject to any disclaimer, the term of this patent is extended or adjusted under 35 U.S.C. 154(b) by 1269 days.

(21) Appl. No.: 12/816,578

(22) Filed: Jun. 16, 2010

(65) Prior Publication Data
US 2010/0319888 A1 Dec. 23, 2010

(30) Foreign Application Priority Data
Jun. 17, 2009 (DE) .......................... 10 2009 025 624

(51) Int. Cl.
| | | |
|---|---|---|
| *F28F 19/00* | (2006.01) | |
| *F28F 13/00* | (2006.01) | |
| *F28D 7/10* | (2006.01) | |
| *F28F 1/00* | (2006.01) | |

(Continued)

(52) U.S. Cl.
CPC .............. *F28D 7/106* (2013.01); *C10G 9/002* (2013.01); *F16L 13/02* (2013.01); *F16L 39/00* (2013.01); *F28D 7/12* (2013.01); *F28F 2265/16* (2013.01); *F28F 2270/00* (2013.01); *F28F 2265/26* (2013.01); *F28F 2230/00* (2013.01)

(58) Field of Classification Search
CPC . F28D 7/106; F28D 2230/00; F28D 2265/16; F28D 2265/26; F28D 2270/00; F16L 13/02; F16L 39/00; F16J 3/02; F16J 3/047; F16J 15/002

USPC ................. 165/134.1, 154, 177, 135; 285/41; 277/608, 616, 625, 637, 641, 642
See application file for complete search history.

(56) References Cited

U.S. PATENT DOCUMENTS

| | | |
|---|---|---|
| 3,012,802 A | 12/1961 | Waite |
| 3,285,632 A | 11/1966 | Dunkhe |

(Continued)

FOREIGN PATENT DOCUMENTS

| | | |
|---|---|---|
| DE | 197 07 915 | 9/1998 |
| EP | 0 066 384 | 8/1982 |

*Primary Examiner* — Allen Flanigan
*Assistant Examiner* — Jason Thompson
(74) *Attorney, Agent, or Firm* — Jennifer S. Stachniak; Robert W. Becker

(57) ABSTRACT

A heat exchanger for cooling reaction gas. A cooled tube receives hot reaction gas from a hot, uncooled tube. The cooled tube comprises a cooled inner tube and a tubular jacket that extends about the inner tube. A tubular connection is disposed between the uncooled and the cooled tubes, and includes a fork-shaped inlet head via which the inner tube is in communication with the uncooled tube. The inlet head is provided with an outer tubular section and an inner tubular section between which is disposed an intermediate space filled with heat-insulating material. The outer tubular section is connected to the tubular jacket. The inner tubular section is spaced slightly axially from the inner tube and is provided with an edge region that juts outwardly and is spaced slightly axially from the inner tube, this slight axial spacing being equal to or less than a maximum thermal expansion of the inlet head. A U-shaped sealing ring is disposed between facing end faces of the inner tube and the inner tubular section, and is disposed in a recess formed in the end face of the inner tubular section, the recess being disposed radially outwardly of the edge region of the inner tubular section.

5 Claims, 2 Drawing Sheets

(51) Int. Cl.
 *C10G 9/00* (2006.01)
 *F16L 13/02* (2006.01)
 *F16L 39/00* (2006.01)
 *F28D 7/12* (2006.01)

(56) References Cited

U.S. PATENT DOCUMENTS

| | | |
|---|---|---|
| 4,997,211 A | 3/1991 | Brücher |
| 5,350,011 A * | 9/1994 | Sylvester ............... 165/135 |
| 5,579,831 A | 12/1996 | Brücher |
| 5,690,168 A * | 11/1997 | Cizmar et al. ............ 165/134.1 |
| 5,732,981 A * | 3/1998 | Brucher et al. ................ 285/41 |
| 5,813,453 A * | 9/1998 | Brucher ................... 165/134.1 |
| 6,027,147 A * | 2/2000 | Elliott ........................ 285/229 |
| 6,302,402 B1 * | 10/2001 | Rynders et al. .............. 277/530 |
| 6,460,893 B1 * | 10/2002 | McGrath ...................... 285/49 |
| 2002/0033135 A1 * | 3/2002 | Kay et al. ..................... 118/715 |
| 2004/0076353 A1 * | 4/2004 | Kubota et al. ................ 384/276 |
| 2005/0230100 A1 * | 10/2005 | Hirth et al. ................... 166/120 |
| 2007/0193729 A1 * | 8/2007 | Spicer et al. .............. 165/134.1 |

\* cited by examiner

HEAT EXCHANGER FOR COOLING REACTION GAS, INCLUDING A TUBULAR CONNECTION BETWEEN A COOLED TUBE AND AN UNCOOLED TUBE

The instant application should be granted the priority date of Jun. 17, 2009, the filing date of the corresponding German patent application 10 2009 025 624.5.

BACKGROUND OF THE INVENTION

The present invention relates to a heat exchanger for cooling reaction gas, and includes a tubular connection between a cooled tube and an uncooled tube.

A heat exchanger of this type for cooling reaction gas, and including a tubular connection, is known from U.S. Pat. No. 5,732,981. Reaction gas is produced by a thermal reaction of hydrocarbons in a reaction furnace. Such reaction furnaces are provided with a number of externally heated reaction tubes, through which the hydrocarbons being used are conveyed, accompanied by the addition of water vapor. The reaction gas produced leaves the reaction tubes at a temperature of up to 900° C., and must be cooled very rapidly to stabilize its molecular composition. The rapid cooling of the reaction gas is effected in reaction gas coolers by means of a heat transfer from the reaction gas to evaporating water that is under a high pressure.

With the tubular connection known from U.S. Pat. No. 5,732,981, the end of the uncooled tube is provided with an inlet head, which is widened in a fork-shaped manner and is provided with an inner and an outer tubular section. The intermediate space between the two tubular sections is filled with a heat-insulating material. The outer tubular section is welded to the tubular casing or jacket of the cooled double tube. The inner tubular section is axially spaced from the inner tube of the cooled double tube, whereby a seal, which is embodied as a ring (C, O, U or V shape), is disposed between the end faces of the inner tubular section and the inner tube; the sealing ring is intended to prevent penetration of reaction gas into the heat-insulating material.

A fork-shaped inlet head which is filled with heat-insulating material, for the connection of an uncooled tube with a cooled tube, is also used with the heat exchanger for cooling reaction gas known from EP 810 414 B1. With the known heat exchanger, the cooled tube is comprised of an inner tube that is surrounded in a radially spaced manner by a tubular casing. A water chamber for the supply of a coolant surrounds the inlet end of the cooled tube. The water chamber is comprised of a solid, square or rectangular part into which is introduced a recessed portion having a circular cross-section. The recessed portion accommodates a single cooled tube, whereby the inner tube of the cooled tube is welded into the base of the recessed portion, and the tubular casing is welded to the water chamber. The outer tubular section of the inlet head is welded to the water chamber on that side that faces away from the tubular casing, while the inner tubular section of the inlet head is axially spaced from the inner tube of the cooled tube.

Due to the axial play between the inner tube and the inner tubular section, the known inlet heads permit an unrestricted thermally caused length expansion. The heat insulation that is introduced causes the outer tubular section of the inlet head, which is fixedly connected with the cooled tube, to assume a wall temperature that is below the temperature of the gas flowing through the uncooled tube. The wall temperatures that the tubes reach at the location of connection in this way adapt to one another, thus minimizing the thermal stresses at the location of connection. The sealing ring (C, O, U or V shape) between the inner tubular section and the inner tube prevents penetration of reaction gas into the heat-insulating material of the inlet head. Above 550° C. carbon can precipitate out of the reaction gas and can deposit upon the sealing ring. As a consequence, the sealing ring can leak, so that reaction gas can penetrate into the heat-insulating material. As a further consequence, carbon precipitating out of the leakage stream of the reaction gas can deposit upon the heat-insulating material, leading to buckling stresses in the inner tubular section, and to circumferential stresses in the outer tubular section of the inlet head.

The object of the present invention is to configure the heat exchanger of the aforementioned type, which includes a tubular connection between an uncooled and a cooled tube, in such a way that the sealing relative to the reaction gas is improved when carbon is precipitated.

SUMMARY OF THE INVENTION

The object is inventively realized for a heat exchanger of the aforementioned type, which includes a tubular connection between an uncooled and a cooled tube, by disposing a U-shaped sealing ring between facing end faces of the inner tube and the inner tubular section, wherein the sealing ring is disposed in a recess formed in the facing end face of the inner tubular section of the inlet head and is disposed radially outwardly of an edge region that is provided in the inner tubular section and is spaced slightly axially from the inner tube, wherein the slight axial spacing between the inner tube and the jutting edge region of the tubular inner section is equal to or less than a maximum thermal expansion of the inlet head.

With the inventive heat exchanger, which includes a tubular connection between an uncooled and a cooled tube, the sealing ring, which is embodied as a U-shaped ring, undertakes the task of a first sealing means, until it reaches a temperature of 500 to 600° C. If above 550° C. the precipitation of carbon out of the reaction gas begins, the thermally caused length extension or expansion of the inner tubular section progresses to such an extent that the gap between the jutting-out edge region of the inner tubular section disposed radially inwardly of the sealing ring, and the inner tube, is bridged, so that a metal-to-metal contact results. Such a contact prevents penetration of reaction gas in a direction toward the sealing ring and the intermediate space between the inner and outer tubular sections of the inlet head, and acts as a second sealing means. In a further embodiment of the invention, the flexible membrane, which closes off the intermediate space that is filled with the heat-insulating material, keeps the reaction gas that might yet penetrate in completely away from the heat insulating material. In this way, the flexible membrane serves as a third sealing means.

BRIEF DESCRIPTION OF THE DRAWINGS

Several exemplary embodiments of the invention will be described in greater detail subsequently and are illustrated in the drawings, in which.

DESCRIPTION OF SPECIFIC EMBODIMENTS

Figure 1:
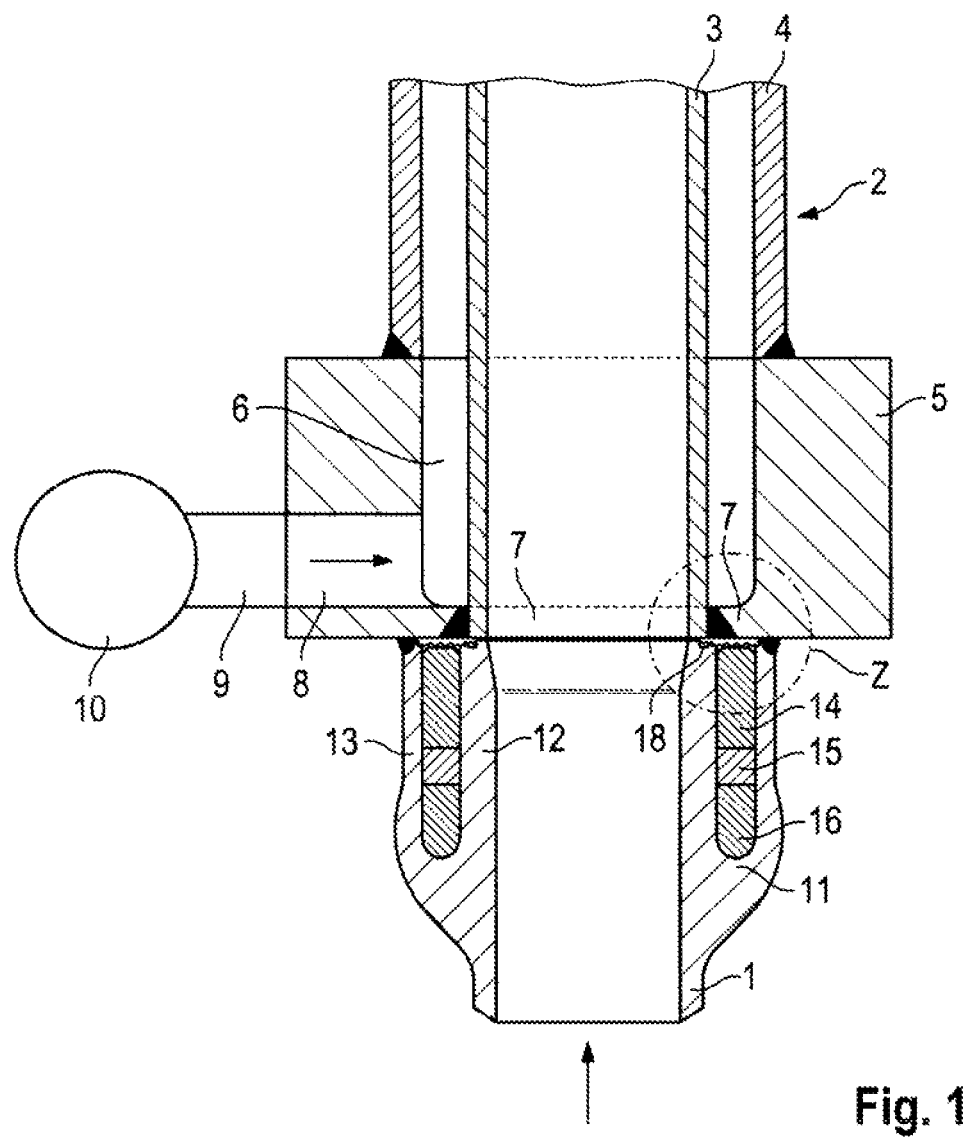
FIG. 1 is a longitudinal cross-sectional view through the lower portion of a heat exchanger having a tubular connection pursuant to the invention.

A reaction gas is produced in a reaction furnace by the reaction of hydrocarbons with water vapor or steam. The reaction furnace is provided with reaction tubes 1, which are heated externally and through which flows material being used. The reaction gas, which leaves the reaction tubes 1 at a temperature of up to 900° C., passes directly into a reaction gas cooler, which is disposed directly above the reaction furnace. In the reaction gas cooler, the molecular composition of the reaction gas is stabilized by an abrupt cooling and heat exchange with evaporating water that is under high pressure.

The reaction gas cooler contains a plurality of cooling tubes 2, which are arranged in a row next to one another such that each cooling tube 2 is associated with one of the uncooled reaction tubes 1, and is disposed in an axial extension thereof. Each cooling tube 2 is comprised of a cooled inner tube 3 which is surrounded by a tubular casing or jacket 4 accompanied by the formation of an annular space through which the coolant flows. As illustrated, the inner diameters of the reaction tube 1 and the inner tube 3 are customarily of a similar magnitude.

The supply and withdrawal of the coolant are respectively effected via a water chamber 5, which surrounds the illustrated lower end and the non-illustrated upper end of the cooling tube 2. The water chamber 5 is manufactured from a solid, square or rectangular piece into which is formed a recessed portion 6 having a circular cross-section; a cooling tube 2 is associated with each recessed portion 6. The tubular jacket 4 is welded to the water chamber 5 on that side that faces away from the reaction tube 1. In so doing, at the weld location the inner diameter of the tubular jacket 4 coincides with the diameter of the recessed portion 6.

The recessed portion 6 is formed into the piece that forms the water chamber 5 to such a depth that an annular base 7 having a small residual thickness remains. The inner tube 3 is welded into this base 7. The surface of the annular base 7 is delimited by the outer diameter of the inner tube 3 and the diameter of the recessed portion 6.

A bore 8 opens, preferably tangentially, into each recessed portion 6 at the level of the base 7. The bores 8 are respectively connected via a connecting piece 9 with a supply line 10 for the coolant. The coolant passes through the bore 8 and enters the recessed portion 6 at a high velocity, generating a rotating flow about the inner tube 3. This flow ensures a good cooling of the base 7 of the recessed portion 6, and also prevents deposition of particles on the base 7 that would lead to a damaging, localized overheating.

The discharge end of the reaction tube 1 is widened in a fork-shaped manner, and forms an inlet head 11. This inlet head 11 is comprised of an inner tubular section 12, which forms the extension of the reaction tube 1, and an outer tubular section 13; the two tubular sections are connected to one another at one end. The outer tubular section 13 is welded to the underside of the water chamber 5. The inner tubular section 12 of the inlet head 11 is axially spaced relative to the inner tube 3.

A heat insulation is introduced into the annular intermediate space between the inner tubular section 12 and the outer tubular section 13 of the inlet head 11. The heat insulation is comprised of several layers of a heat-insulating material, which are disposed one after the other in the axial direction. In the illustrated embodiment, three layers are provided, and in particular a first layer 14, a second layer 15, and a third layer 16. The layers 14, 15, 16 differ from one another in their heat conductivity. In this connection, the layers 14, 15, 16 are introduced into the intermediate space in such a way that the first layer 14, which faces the inner tube 3, has the lowest heat conductivity coefficient and the third layer 16, which faces the reaction tube 1, has the highest heat conductivity coefficient. The layer 15 disposed between them has a middle heat conductivity coefficient. The insulation effect of the layers 14, 15, 16 therefore increases in a direction toward the inner tube 3, i.e. in a direction away from the reaction tube 1. The differing heat conductivity coefficients can be varied by the selection of materials or the density or the thickness of the layers 14, 15, 16. The height of the individual layers 14, 15, 16 in the axial direction can differ, and is determined by the desired change in insulating effect.

The differences in the heat conductivity coefficients are between 10 W/m*K on that side facing the reaction tube 1, and 0.2 to 0.6 W/m*K on that side facing the inner tube 3. The heat insulation can be comprised of a mineral or fibrous material, and is introduced into the intermediate space as a poured or cast and curable mass, or as a molded part.

Figure 2:
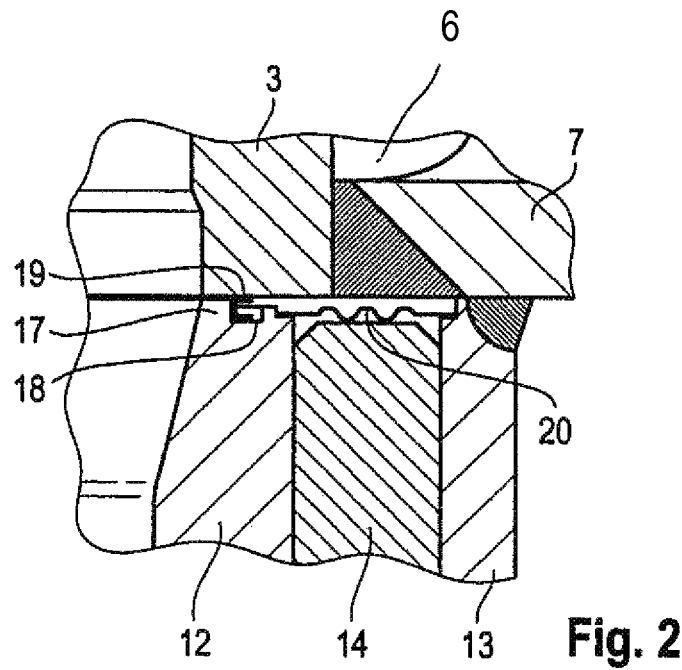
FIG. 2 shows the detailed area Z of FIG. 1 or FIG. 3.

The inner diameter of the inner tubular section 12 is the same as the inner diameter of the inner tube 3. As can be recognized from FIG. 2, the end face of the inner tubular section 12 has an edge region 17 that proceeds from the inner diameter and juts outwardly. Radially outwardly of the edge region 17, the end face of the inner tubular section 12 is provided with an annular recess 18. A sealing ring embodied as a U-shaped ring 19 is placed into the recess 18. The legs of the U-shaped ring 19 rest against the base of the recess 18 and against the end face of the inner tube 3. The U-shaped ring 19 serves as a first seal that at low temperatures prevents the escape of reaction gas in a direction toward the intermediate space within the inlet head 11 and of the heat-insulating material introduced therein.

The axial spacing of the inwardly disposed edge region 17 of the inner tubular section 12 from the end face of the inner tube 3 is less than the maximum thermally caused length extension or expansion of the inlet head 11 that occurs during operation due to the dimension of the inlet head 11. When a predetermined temperature has been reached, as the length expansion progresses the spacing between the inlet head 11 and the inner tube 3 is bridged, resulting in a metal-to-metal contact between the jutting-out edge region 17 of the inner tubular section 12 and the inner tube 3. This metal-to-metal contact acts as a second seal and, at higher temperatures, prevents a penetration of reaction gas in the direction toward the U-shaped ring 19 and the intermediate space within the inlet head 11, or at least extensively limits such a penetration.

The intermediate space within the inlet head 11 that accommodates the heat-insulating material is closed off by an annular, elastic membrane 20 that is not permeable to gas. The membrane 20 is sealingly secured to the inner and the outer tubular sections 12, 13. The membrane 20 is preferably corrugated. It serves as a third seal and prevents exhaust gas that might have penetrated through the U-shaped ring 19 from reaching the heat-insulating material.

Instead of the water chamber 5 described above, the inlet head 11 can also be welded to a differently-configured collection means for the supply of the coolant to the cooled tube.

Figure 3:
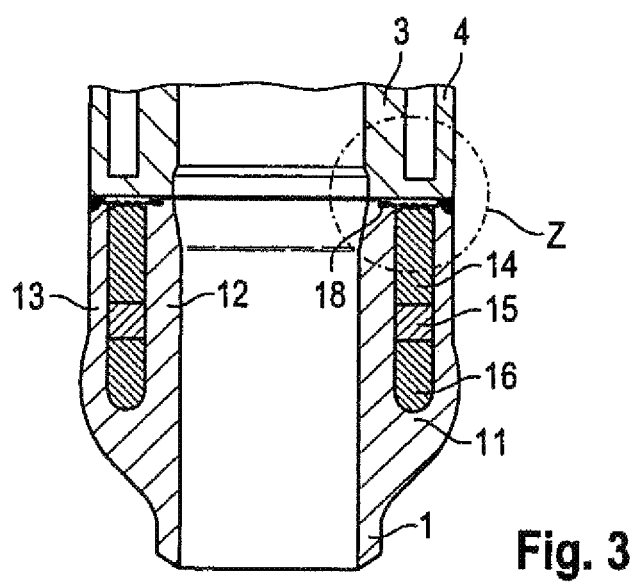
FIG. 3 is a longitudinal cross-sectional view through the lower portion of a heat exchanger having a different tubular connection pursuant to the invention.

As shown in FIG. 3, the inlet head 11 can also be connected directly to the cooled tube, which is comprised of the inner tube 3 and the tubular jacket 4, by welding the outer tubular section 13 of the inlet head 11 outwardly to the cooled tube. The inner tubular section 12 of the inlet head 11 is embodied in the manner described above, and is disposed across from the closed end of the cooled tube, whereby a U-shaped ring 19 is provided as a sealing ring in the recess 18 of the end face of the inner tubular section 12 radially outwardly ahead of the jutting-out edge region 17, and the intermediate space between the inner and the outer tubular sections 12, 13 of the inlet head 11 is closed off by the gas impermeable membrane 20.

The specification incorporates by reference the disclosure of German priority document 10 2009 025 624.5 filed 17 Jun. 2009.

The present invention is, of course, in no way restricted to the specific disclosure of the specification and drawings, but also encompasses any modifications within the scope of the appended claims.

We claim:

1. A heat exchanger for cooling reaction gas, comprising:
   an uncooled tube configured to convey hot reaction gas;
   a cooled tube configured to receive hot reaction gas to be cooled, wherein said cooled tube comprises a cooled inner tube and a tubular jacket that extends about said inner tube;
   a tubular connection disposed between said uncooled tube and said cooled tube, wherein said tubular connection includes a fork-shaped inlet head, further wherein said inner tube is in communication with said uncooled tube via said inlet head, further wherein said inlet head is provided with an outer tubular section and an inner tubular section, further wherein an intermediate space filled with heat-insulating material is disposed between said inner and outer tubular sections, further wherein said outer tubular section is connected to said tubular jacket, further wherein said inner tubular section is spaced slightly axially from said inner tube,
   further wherein said inner tubular section is provided with an edge region that juts outwardly and is spaced slightly axially from said inner tube, and wherein said slight axial spacing between said inner tube and said edge region of said inner tubular section is equal to or less than a maximum thermal axial expansion of said inlet head; and
   a U-shaped sealing ring disposed between facing end faces of said inner tube and said inner tubular section, wherein said sealing ring is disposed in a recess formed in said facing end face of said inner tubular section of said inlet head, and wherein said recess is disposed radially outwardly of said edge region of said inner tubular section, wherein the U-shaped sealing serves as a first seal that at low temperatures prevents escape of reaction gas in a direction toward the intermediate space within the inlet head and of the heat-insulating material therein, wherein contact between said inner tube and said edge region of said inner tubular section serves as a second seal and, at higher temperatures, limits or prevents a penetration of reaction gas in a direction toward the U-shaped ring and the intermediate space within the inlet head;
   a gas impermeable, flexible membrane disposed above said intermediate space of said inlet head that accommodates said heat-insulating material, and wherein said membrane is fused in a sealed manner to said inner and outer tubular sections of said inlet head, wherein the membrane serves as a third seal and prevents exhaust gas that might have penetrated through the U-shaped ring from reaching the heat-insulating material.

2. A heat exchanger according to claim 1, wherein said gas impermeable membrane is corrugated.

3. A heat exchanger according to claim 1, which further comprises a water chamber that is comprised of a solid, rod-shaped piece, wherein circular recessed portions are introduced into said water chamber, further wherein said outer tubular section of said inlet head, and said tubular jacket, are connected at ends that are respectively disposed across from one another to said water chamber, further wherein each of said recessed portions surrounds a single inner tube, which is welded to a thin base of said recessed portion, and wherein each recessed portion has a diameter that corresponds to an inner diameter of said tubular jacket.

4. A heat exchanger according to claim 3, wherein said outer tubular section of said inlet head is connected directly to said tubular jacket.

5. A heat exchanger according to claim 1, wherein said heat-insulating material is built up of a plurality of layers that are disposed one after the other in an axial direction, and wherein said layers are provided with heat conductivity coefficients that increase as a distance of said layer from said inner tube increases.

* * * * *